US011942679B2

(12) United States Patent
Muhleman et al.

(10) Patent No.: US 11,942,679 B2
(45) Date of Patent: Mar. 26, 2024

(54) ANTENNA EXTENDED WITH A LASER INDUCED PLASMA

(71) Applicant: The United States of America, as represented by the Secretary of the Navy, San Diego, CA (US)

(72) Inventors: Daniel Howard Muhleman, El Cajon, CA (US); Alexandru Hening, San Diego, CA (US)

(73) Assignee: USA as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/894,737

(22) Filed: Aug. 24, 2022

(65) Prior Publication Data

US 2024/0072422 A1 Feb. 29, 2024

(51) Int. Cl.
*H01Q 1/26* (2006.01)

(52) U.S. Cl.
CPC .................................... *H01Q 1/26* (2013.01)

(58) Field of Classification Search
CPC ........................................................ H01Q 1/26
See application file for complete search history.

(56) References Cited

U.S. PATENT DOCUMENTS 6,492,956 B1 12/2002 Fischer
10,069,564 B2 4/2018 Hening
2004/0041741 A1* 3/2004 Hayes ................ H01Q 15/0033 343/909
2020/0176856 A1* 6/2020 Hening ................ H01Q 19/108

* cited by examiner

*Primary Examiner* — Hoang V Nguyen
*Assistant Examiner* — Yonchan J Kim
(74) *Attorney, Agent, or Firm* — Naval Information Warfare Center, Pacific; Kyle Eppele; Andrew J. Cameron

(57) ABSTRACT

An antenna extender and an antenna extended with a laser induced includes a laser source and an antenna feed. The laser source is capable of emitting a laser beam along an axis with sufficient power to produce a laser induced plasma in an atmosphere along the axis of the laser beam. The antenna feed extends along the axis for coupling between a radiofrequency signal and the laser induced plasma. The antenna feed extended with the laser induced plasma has an enhanced radiation efficiency for the radiofrequency signal that is greater than the antenna feed that is not extended and has a stub radiation efficiency for the radiofrequency signal when the laser source is deactivated and does not emit the laser beam.

5 Claims, 3 Drawing Sheets

ANTENNA EXTENDED WITH A LASER INDUCED PLASMA

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 105422.

BACKGROUND OF THE INVENTION

Antennas radiate radiofrequency signals as electromagnetic radiation. There is a general need for antennas that efficiently radiate over a wide bandwidth and are compact, especially is a stowed configuration.

SUMMARY

An antenna extender and an antenna extended with a laser-induced includes a laser source and an antenna feed. The laser source is capable of emitting a laser beam along an axis with sufficient power to produce a laser-induced plasma in an atmosphere along the axis of the laser beam. The antenna feed extends along the axis for coupling between a radiofrequency signal and the laser-induced plasma. The antenna feed extended with the laser-induced plasma has an enhanced radiation efficiency for the radiofrequency signal that is greater than the antenna feed that is not extended and has a stub radiation efficiency for the radiofrequency signal when the laser source is deactivated and does not emit the laser beam.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
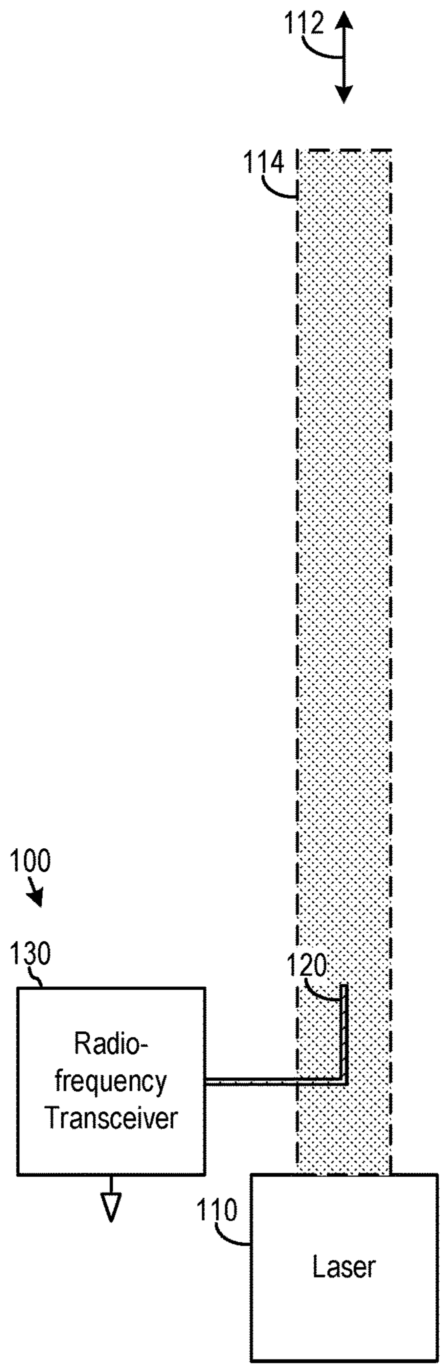
FIG. 1 is a block diagram of an antenna extender optionally extended with a laser-induced plasma in accordance with an embodiment of the invention.

FIG. 1 is a block diagram of an antenna extender 100 optionally extended with a laser-induced plasma 114 in accordance with an embodiment of the invention. The antenna extender 100 includes a laser source 110 and an antenna feed 120.

The laser source 110 emits a laser beam along an axis 112 with sufficient power to produce a laser-induced plasma 114 in an atmosphere along the axis 112 of the laser beam. While laser source 110 emits the laser beam, the laser-induced plasma 114 extends the antenna feed 120. In this embodiment, when the laser source 110 is deactivated, the antenna feed 120 is too short to efficiently radiate the radiofrequency signal from radiofrequency transceiver 130, but when the laser source 110 is activated, the antenna feed 120 extended with the laser-induced plasma 114 efficiently radiates the radiofrequency signal from radiofrequency transceiver 130.

The antenna feed 120 is shown in FIG. 1 with a minimal stub length for effective conductive coupling between the radiofrequency signal and the laser-induced plasma 114. Note the laser-induced plasma 114 is not specifically included in the antenna extender 100, which includes the antenna feed 120 and the laser source 110 capable of generating the laser-induced plasma 114.

In general, the laser source 110 is arranged to emit the laser beam that is coaxial along the axis 112 with the antenna feed 120. The antenna feed 120 extends along the axis 112 for coupling between the radiofrequency signal and the laser-induced plasma 114. The antenna feed 120 extended with the laser-induced plasma 114 has an enhanced radiation efficiency for the radiofrequency signal that is greater than the antenna feed 120 that is not extended. The antenna feed 120 has a stub radiation efficiency for the radiofrequency signal when the laser source 110 is deactivated and does not emit the laser beam. The enhanced radiation efficiency for the radiofrequency signal is greater than the stub radiation efficiency for the radiofrequency signal because the antenna feed 120 extended with the laser-induced plasma 114 has greater radiation efficiency for radiating the radiofrequency signal than the antenna feed 120 that is not extended.

In an embodiment, the laser source 110 is configured to emit the laser beam only when the radiofrequency signal transfers low-frequency components with long wavelengths not efficiently radiated from the antenna feed 120 that is not extended. The antenna laser source 110 is configured to not emit the laser beam when the radiofrequency signal only transfers high-frequency components with short wavelengths efficiently radiated from the antenna feed 120 that is not extended.

Figure 2:
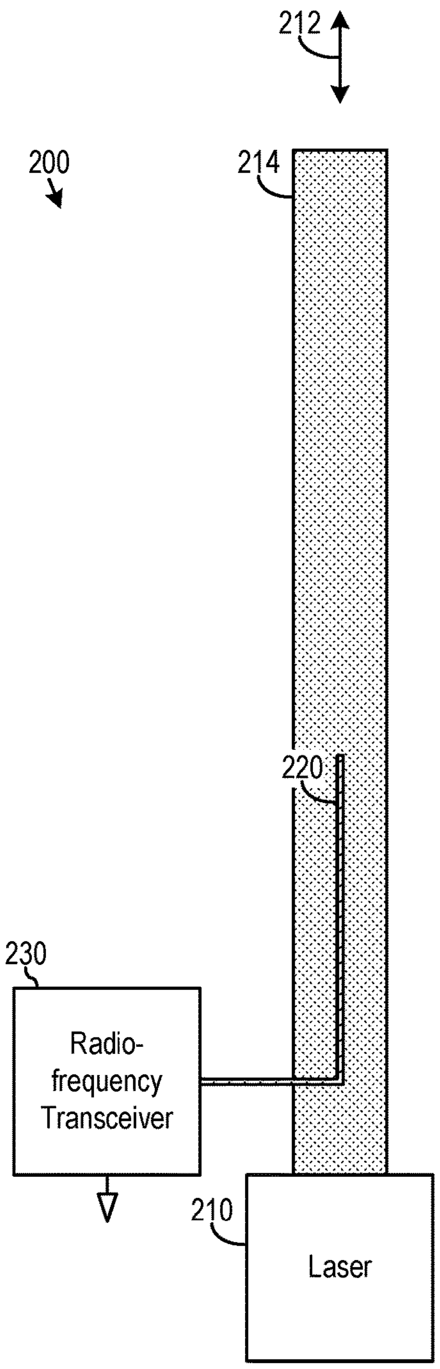
FIG. 2 is a block diagram of an antenna extended with a laser-induced plasma in accordance with an embodiment of the invention.

FIG. 2 is a block diagram of an antenna 200 extended with a laser-induced plasma 214 in accordance with an embodiment of the invention. The antenna 200 includes a laser source 210, an antenna feed 220, and the laser-induced plasma 214. The laser beam from the laser source 210 and the antenna feed 220 are coaxial along the axis 212.

The laser source 210 emits the laser beam along the axis 212 with sufficient power to produce the laser-induced plasma 214 in an atmosphere along the axis 212 of the laser beam. The antenna feed 220 extends along the axis 212 and couples between a radiofrequency signal from radiofrequency transceiver 230 and the laser-induced plasma 214. The antenna feed 220 extended with the laser-induced plasma 214 has an enhanced radiation efficiency for the radiofrequency signal as compared with the antenna feed 220 alone.

The enhanced radiation efficiency for the radiofrequency signal is greater than a stub radiation efficiency of the antenna feed 220 alone for the radiofrequency signal because the antenna feed 220 extended with the laser-induced plasma 214 has greater radiation efficiency for radiating the radiofrequency signal than the antenna feed 220 alone.

The antenna feed 220 is shown in FIG. 2 with a length efficiently radiating high-frequency components of a radiofrequency signal from radiofrequency transceiver 230. In one embodiment, the laser source 210 is configured to cease emitting the laser beam when the radiofrequency signal only transfers high-frequency components with short wavelengths efficiently radiated from the antenna feed 220 alone.

The increased length of the antenna feed 220 of FIG. 2 as compared with the antenna feed 120 of FIG. 1 also produces more effective conductive coupling between the antenna feed 220 and the laser-induced plasma 214. Even when the laser source 210 is activated to generate the laser-induced plasma 214, because the antenna feed 220 is typically composed of a metal, such as aluminum, copper, or stainless steel, with higher conductivity than the laser-induced plasma 214, the longer antenna feed 220 also increases radiation efficiency as compared with the antenna feed 120 extended with the laser-induced plasma 114 of FIG. 1. It will be appreciated that conductive coupling is enhanced when the antenna feed 220 is coated with a low work function material, such as lanthanum oxide.

Figures 3A, 3B, 4A, 4B:
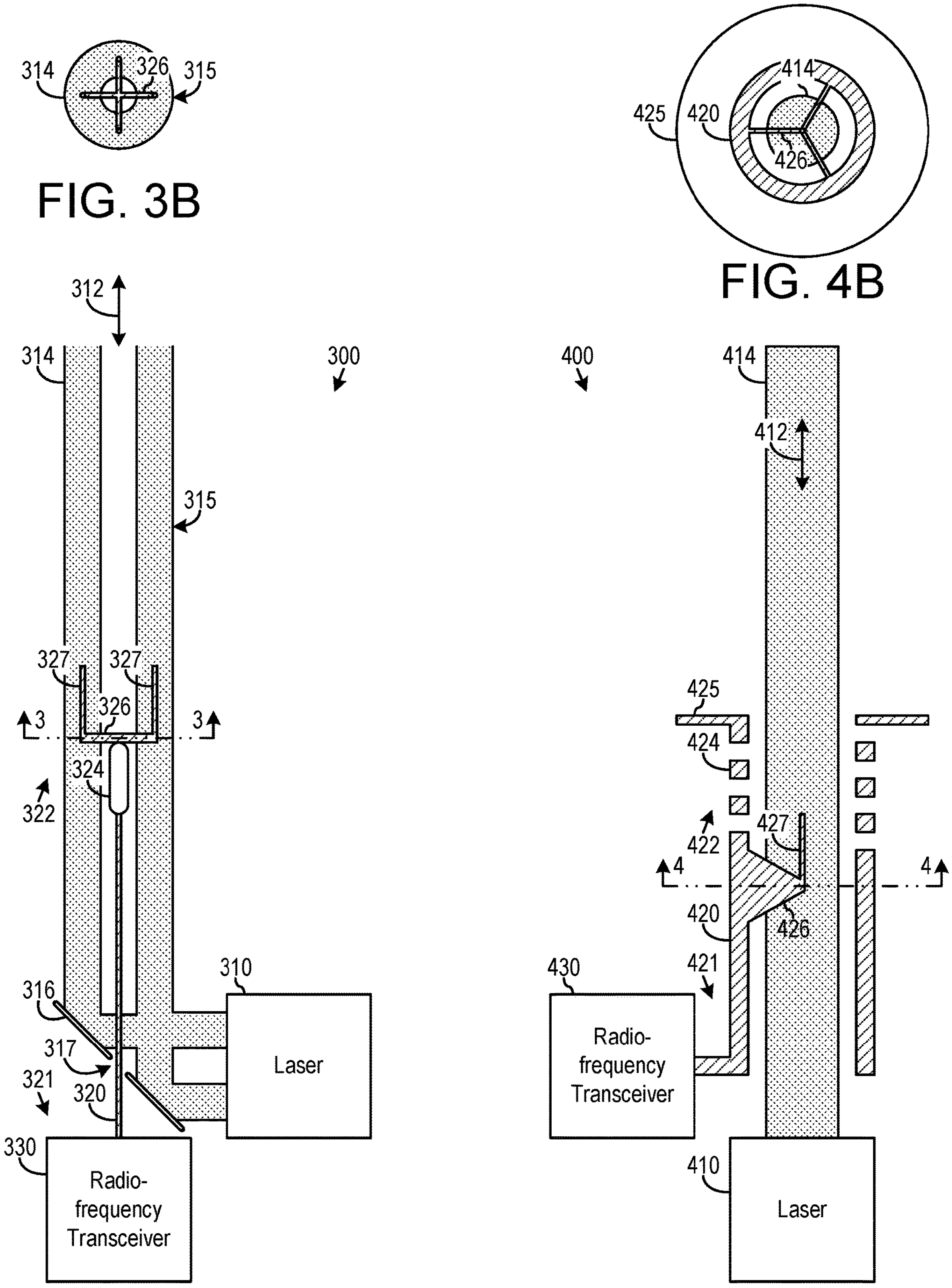
FIG. 3A is a cross-section through an antenna extended with a laser-induced plasma in accordance with an embodiment of the invention.
FIG. 3B is a cross-section along section line 3-3 in FIG. 3A.
FIG. 4A is a cross-section through an antenna extended with a laser-induced plasma in accordance with an embodiment of the invention.
FIG. 4B is a cross-section along section line 4-4 in FIG. 4A.

FIG. 3A is a cross-section through an antenna 300 extended with a laser-induced plasma 314 in accordance with an embodiment of the invention. FIG. 3B is a cross-section along section line 3-3 in FIG. 3A.

The laser source 310 is arranged to emit the laser beam that is tubular and surrounds the antenna feed 320 that is cylindrical along the axis 312. The laser source 310 emits a laser beam along an axis 312 with sufficient power to produce the laser-induced plasma 314 in an atmosphere along the axis 312 of the laser beam. The atmosphere is gaseous or liquid. In one embodiment, an annular mirror 316 is tilted for acutely reflecting the laser beam, and the antenna feed 320 passes through a central opening 317 in the annular mirror 316.

The antenna feed 320 extends along the axis 312 for coupling between a radiofrequency signal and the laser-induced plasma 314. The antenna feed 320 includes four supports 326 with stubs 327 coupling between the radiofrequency signal and the laser-induced plasma 314. It will be appreciated that there is less than four or more than four supports 326 with stubs 327 in various embodiments of the invention. The stubs 327 of antenna feed 320 extend along the axis 312 and are shown in FIG. 3A with a minimal length for effective conductive coupling between the radiofrequency signal and the laser-induced plasma 314.

The antenna feed 320 has a first end 321 and a second end 322. The radiofrequency signal from the radiofrequency transceiver 330 is coupled to the first end 321 of the antenna feed 320. In one embodiment, the antenna feed 320 includes top inductive and/or capacitive loading 324 near the second end 322. The top loading 324 increases the radiation efficiency of the antenna 300, especially when the laser source 310 is deactivated to cease producing the laser-induced plasma 314. The supports 326 with stubs 327 contribute to the top loading, especially the capacitive component of the top loading. It will be appreciated that the top loading 324 accounts for the effects of the supports 326 with stubs 327, and that the top loading 324 is disposed either above or below the supports 326.

The antenna feed 320 extended with the laser-induced plasma 314 has an enhanced radiation efficiency for the radiofrequency signal that is greater than a stub radiation efficiency for the radiofrequency signal when the laser source 310 is deactivated and does not emit the laser beam. In addition, the hollow configuration of the laser-induced plasma 314 increases the outer surface area of the laser-induced plasma 314. This increased surface area reduces the impact of skin effect that tends to confine radiofrequency currents within an outer layer 315 of the laser-induced plasma 314 rather than the entire cross-section of the laser-induced plasma 314. This increases the radiofrequency conductivity of the laser-induced plasma 314, and hence further increases radiation efficiency.

FIG. 4A is a cross-section through an antenna 400 extended with a laser-induced plasma in accordance with an embodiment of the invention. FIG. 4B is a cross-section along section line 4-4 in FIG. 4A.

A laser source 410 emits a laser beam along an axis 412 with sufficient power to produce a laser-induced plasma 414 in an atmosphere along the axis 412 of the laser beam. The antenna feed 420 is tubular and surrounds the axis 412 and also surrounds the laser beam that is cylindrical along the axis 412.

The antenna feed 420 has a first end 421 and a second end 422. The radiofrequency signal from the radiofrequency transceiver 430 is coupled to the first end 421 of the antenna feed 420. The antenna feed 420 includes at least one support 426 with stub 427 near the second end 422. The support 426 with stub 427 couples the radiofrequency signal between the antenna feed 420 and the laser-induced plasma 414. In one embodiment, the antenna feed 420 includes top inductive and/or capacitive loading near the second end 422. For example, the top loading of the antenna feed 420 includes an inductive coil 424 (with the same diameter as the tubular antenna feed 420) and an annular capacitive plate 425 above the support 426. Although support 426 is one of three supports shown in FIG. 4B, it will be appreciated that there is a different number of supports in other embodiments, including an embodiment with only one support 426 supporting one stub 427.

Figure 5:
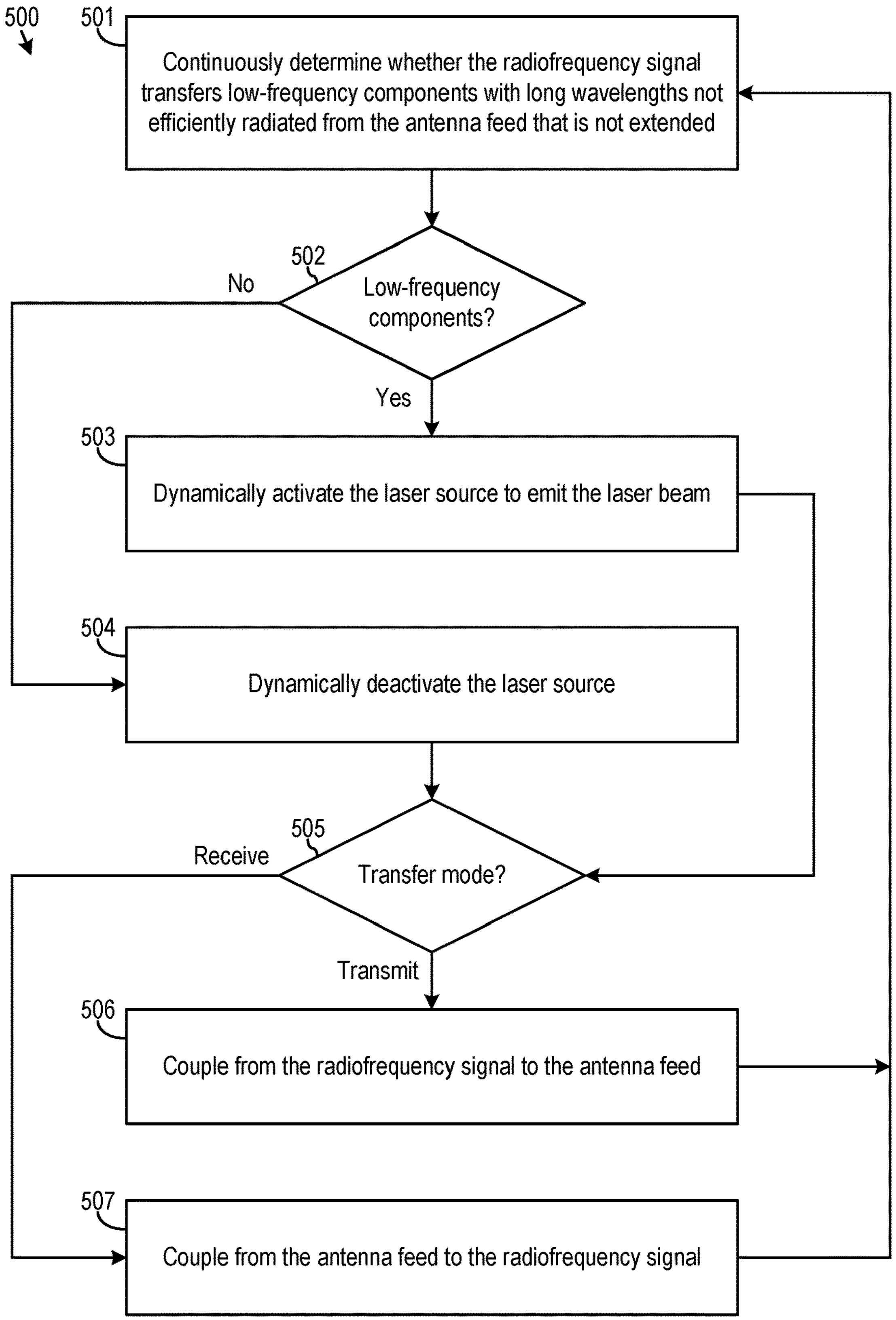
FIG. 5 is a flow diagram of a process for operating an antenna extender optionally extended with a laser-induced plasma in accordance with an embodiment of the invention.

FIG. 5 is a flow diagram of a process 500 for operating an antenna extender optionally extended with a laser-induced plasma in accordance with an embodiment of the invention. While extended with the laser-induced plasma, the antenna extender has enhanced radiation efficiency for transmitting and receiving a radiofrequency signal.

At step 501, process 500 continuously determines whether the radiofrequency signal transfers low-frequency components with long wavelengths not efficiently radiated from an antenna feed that is not extended. Decision 502 checks whether the radiofrequency signal transfers such low-frequency components. In response to the radiofrequency signal transferring the low-frequency components, process 500 proceeds to step 503; otherwise, process 500 proceeds to step 504. At step 503, the laser source is dynamically activated to emit the laser beam producing the laser-induced plasma, but at step 504, the laser source is dynamically deactivated.

Decision 505 checks the transfer mode for the antenna extender. If the transfer mode is currently a transmit mode, process 500 proceeds to step 506. If the transfer mode is currently a receive mode, process 500 proceeds to step 507. At step 506 during the transmit mode, the radiofrequency signal is coupled to the antenna feed, and if the laser source was activated at step 503, then the radiofrequency signal is further coupled to the laser-induced plasma. At step 507 during the receive mode, the antenna feed is coupled to the radiofrequency signal, and if the laser source was activated at step 503, then this couples the laser-induced plasma to the radiofrequency signal via the antenna feed.

From steps 506 and 507, process 500 returns to step 501 to check for changes in the actual or expected frequency components of the radiofrequency signal and for changes from the transmit mode to the receive mode, or vice versa. In respective additional embodiments, the antenna extender operates only in the transmit mode or only in the receive mode.

From the above description of Antenna Extended with a Laser-Induced Plasma, it is manifest that various techniques may be used for implementing the concepts of antenna extender 100, antennas 200, 300, and 400, and process 500 without departing from the scope of the claims. The described embodiments are to be considered in all respects as illustrative and not restrictive. The antenna extender 100, antennas 200, 300, and 400, and process 500 disclosed herein may be practiced in the absence of any element that is not specifically claimed and/or disclosed herein. It should also be understood that each of antenna extender 100 or antennas 200, 300, or 400 or process 500 is not limited to the particular embodiments described herein, but is capable of many embodiments without departing from the scope of the claims.

We claim:

1. An antenna extender comprising:

a laser source for emitting a laser beam along an axis of the laser beam with sufficient power to produce a laser induced plasma in an atmosphere along the axis of the laser beam; and an antenna feed extending along the axis of the laser beam for coupling between a radiofrequency signal and the laser induced plasma, wherein the antenna feed includes metal disposed within the laser induced plasma, and wherein the antenna feed extended with the laser induced plasma has an enhanced radiation efficiency for the radiofrequency signal that is greater than the antenna feed that is not extended and has a stub radiation efficiency for the radiofrequency signal when the laser source is deactivated and does not emit the laser beam.

2. The antenna extender of claim 1, wherein the laser source is arranged to emit the laser beam that is coaxial along the axis of the laser beam with the metal of the antenna feed.

3. The antenna extender of claim 1, wherein the enhanced radiation efficiency for the radiofrequency signal is greater than the stub radiation efficiency for the radiofrequency signal because the antenna feed extended with the laser induced plasma has greater radiation efficiency for radiating the radiofrequency signal than the antenna feed that is not extended.

4. The antenna extender of claim 1, wherein the antenna feed comprises a coating of a low work function material.

5. The antenna extender of claim 4, wherein the low work function material comprises lanthanum oxide.

* * * * *